United States Patent [19]

Kohguchi et al.

[11] Patent Number: 4,784,084
[45] Date of Patent: Nov. 15, 1988

[54] BREEDING CAGE FOR SMALL ANIMAL AND BREEDING OF SMALL ANIMAL USING THE SAME

[75] Inventors: Michihiro Kohguchi; Tetsushi Ishikawa; Toshio Miyake, all of Okayama, Japan

[73] Assignee: Kabushiki Kaisha Hayashibara Seibutsu Kagaku Kenkyujo, Okayama, Japan

[21] Appl. No.: 942,804

[22] Filed: Dec. 17, 1986

[30] Foreign Application Priority Data

Dec. 31, 1985 [JP] Japan .................................. 60-297359

[51] Int. Cl.⁴ .............................................. A01K 31/00
[52] U.S. Cl. .................................................... 119/18
[58] Field of Search .................... 119/17, 18, 61, 51 R

[56] References Cited

U.S. PATENT DOCUMENTS

| | | | |
|---|---|---|---|
| 3,002,492 | 10/1961 | Naturale | 119/18 |
| 3,518,971 | 7/1970 | Gasse et al. | 119/18 |
| 3,830,200 | 8/1974 | Patterson | 119/17 X |
| 3,978,819 | 9/1976 | Lovitt | 119/18 X |

FOREIGN PATENT DOCUMENTS

| | | | |
|---|---|---|---|
| 3411679 | 10/1984 | Fed. Rep. of Germany | 119/18 |
| 682198 | 11/1952 | United Kingdom | 119/18 |
| 967112 | 8/1964 | United Kingdom | 119/18 |

Primary Examiner—Robert P. Swiatek
Assistant Examiner—R. Thomas Price
Attorney, Agent, or Firm—Browdy and Neimark

[57] ABSTRACT

There is disclosed a novel breeding cage and breeding of small animal using the same. The breeding cage comprises a feeder; and a top-opened body in trapezoidal shape that widens towards the top opening, the front wall having through its upper part an opening that can be removably closed with the feeder.

17 Claims, 2 Drawing Sheets

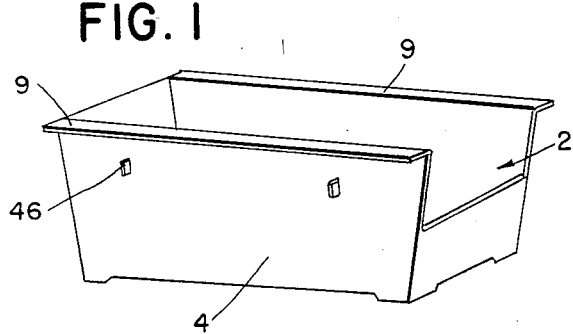
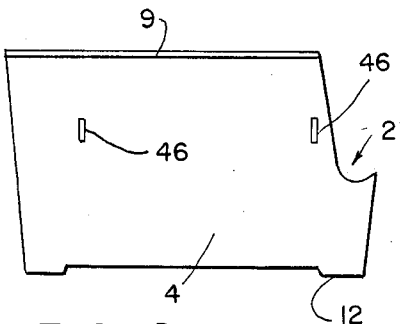
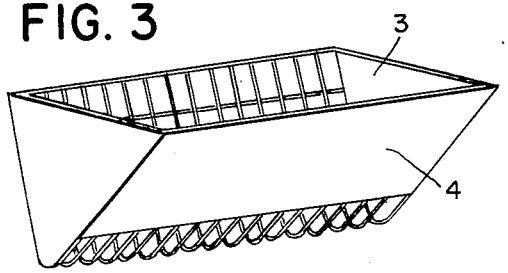
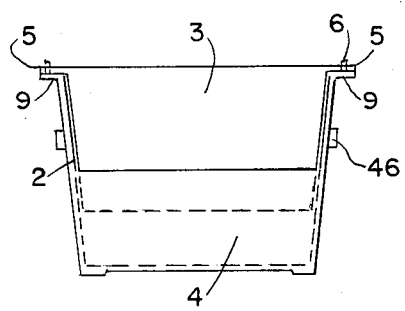
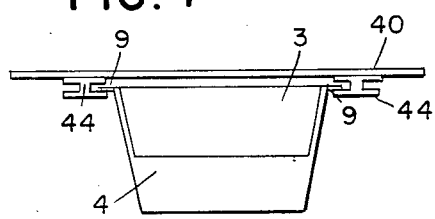
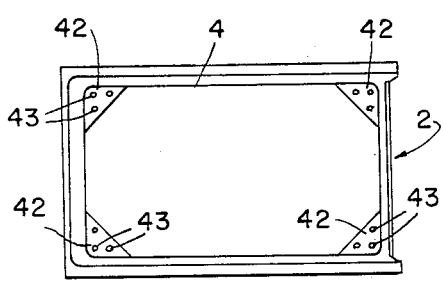
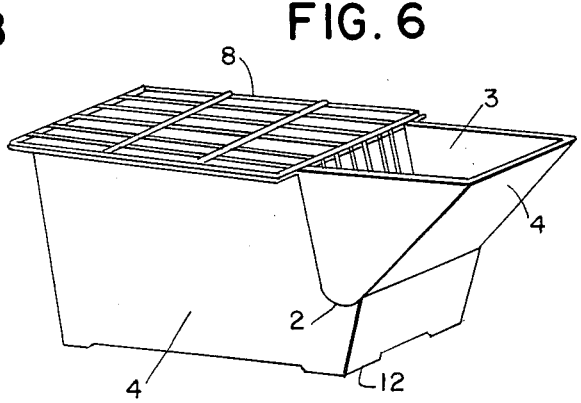
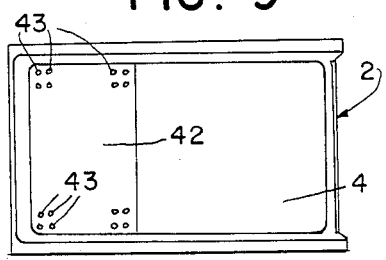
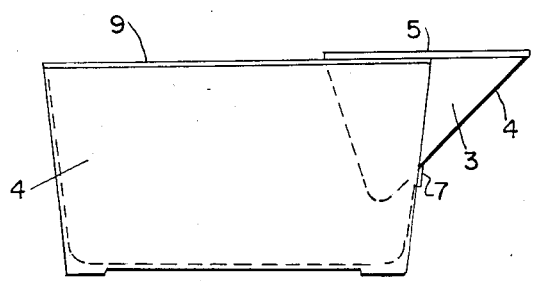

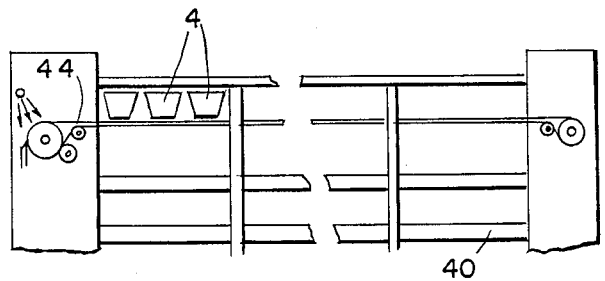
FIG. 10
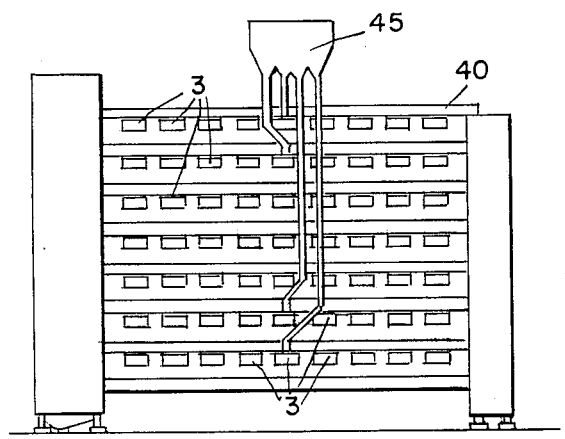
FIG. 11
FIG. 12
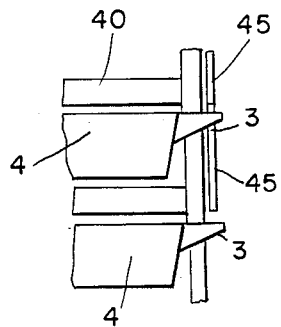
FIG. 13
(PRIOR ART)
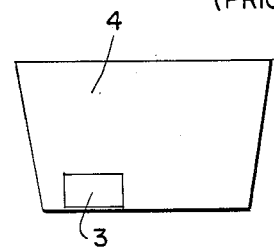
FIG. 14
(PRIOR ART)
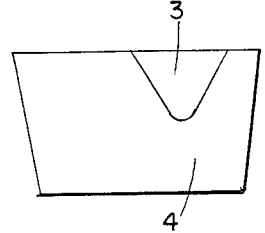
FIG. 15
(PRIOR ART)
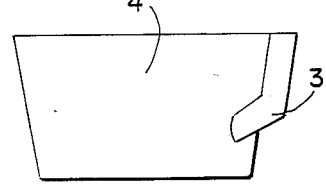

BREEDING CAGE FOR SMALL ANIMAL AND BREEDING OF SMALL ANIMAL USING THE SAME

BACKGROUND OF THE INVENTION

1. Field of the Invention

The present invention relates to a trapezoidal breeding cage that widens toward the top of the breeding cage, as well as to a method for breeding small animals using the same.

2. Description of the Prior Art

Recently, small animals such as mice, hamsters, rats, and guinea pigs have been bred on a large scale for use in metabolic testing of pharmaceuticals or for in vivo proliferation of human cells.

To breed such animals, trapezoidal breeding cages which widen toward the top of the breeding cage have been developed. These breeding cages can be grouped into the following types:

type (i) wherein a feeder is provided on the inside bottom of the breeding cage as shown in FIG. 13;

type (ii) wherein a relatively large feeder is wholly plunged into the breeding cage as shown in FIG. 14;

type (iii) wherein, as shown in FIG. 15, a feeder is equipped through the front wall of the breding cage in such a manner that the top opening of the feeder comes outside the breeding cage, while the lower end of the feeder comes inside the breeding cage.

The breeding cage of type (i), however, has the demerits that feed supply becomes troublesome and that inside of the breeding cage may be littered because the small animal in the breeding cage is liable to spill feed.

Small animals, specifically, those having cheek pouches, such as squirrels and hamsters, commonly have the undesirable behavior of excessively taking feed and temporarily storing it in bedding.

The breeding cage of type (ii) has the demerits that it undesirably provides a reduced resident space for small animals; and that it renders automatic feeding very difficult because, when a plurality of such breeding cages are multilayered in a rack for multiple breeding, particular breeding cages must be pulled out from the rack on feeding.

The breeding cage of type (iii) has the demerits that the feeder prevents compact stacking; and that it is not acceptable for multiple breeding because it requires a relatively large space for all the related activities such as movement, washing and drying.

In light of the above, the development of a breeding cage which can be multilayers in a rack for multiple breeding has been greatly desired, but no satisfactory means has been provided.

SUMMARY OF THE INVENTION

In view of the foregoing, various means which will enable multiple breeding of small animals were investigated.

As the result, it was found that these drawbacks of the conventional breeding cages are overcome with a breeding cage comprising a body and a feeder which partially composes the breeding cage, particularly, a breeding cage comprising a trapezoidal top-opened body widening toward the top of the body, the front wall having through its upper part an opening that can be removably closed with a feeder.

DESCRIPTION OF THE PREFERRED EMBODIMENT

The present invention will hereinafter be explained with reference to the accompanying drawings in which:

FIG. 1 is a perspective diagram of the body of an embodiment according to the invention;

FIG. 2 is a side elevation view of the body of another embodiment according to the invention;

FIG. 3 is a perspective diagram of a feeder;

FIG. 4 is a front elevation view of a breeding cage according to the invention;

FIG. 5 is a side elevation view of still another embodiment according to the invention;

FIG. 6 is a perspective diagram of an additional embodiment according to the invention;

FIG. 7 is a front elevation view of the principal part illustrating engagement of a breeding cage with a rack;

FIG. 8 is a top plan view of the body;

FIG. 9 is a top plan view of the body of another embodiment;

FIG. 10 is a front elevation view of the principal part illustrating stacking of breeding cages in a rack;

FIG. 11 is a front elevation view illustrative of stacking feeding cages in a rack;

FIG. 12 is a side elevation view of the principal part illustrative of stacking breeding cages in a rack; and FIGS. 13-15 are longitudinal sectional views of conventional breeding cages.

Reference numeral 1 designates a metal body made of synthetic resin or metal. The body is a trapezoidal top-opened vessel that widens toward the top opening. Since a plurality of bodies 1 shaped as above can be stacked by plunging one body on the top of another body, the handling of the breeding cage during movement or housing, can be greatly facilitated. Body 1 may be made with a synthetic resin, preferably, thermoplastic- or thermosetting-resin. In this case, although body 1 can be formed by providing particular side- and bottom-walls, and assembling the walls with an adhesive, it is favorable to form cage 1 in one piece. The use of a transparent or semi-transparent synthetic resin is convenient because the small animal in the breeding cage can be observed through the side wall. A colored synthetic resin can be used, if necessary. When body 1 is made with a metal, the use of a metal mesh, such as that of steel or stainless steel, is desirable.

Reference numeral 2 designates an opening which is provided through the upper part of or over the front wall of body 1 as shown in FIG. 1. If necessary, opening 2 may extend to the adjacent side walls as shown in FIG. 2.

Reference numeral 3 designates a feeder which is removably attached to body 1 in such a manner that feeder 3 closes opening 2. As shown in FIG. 3, feeder 3 is shaped into a top-opened trough having a forwardly-inclined front wall, and the cross-sectional shape of feeder 3 is triangular, arcuate, or a combination thereof which essentially provides a forwardly-inclined front wall 4 of linear or arcuate form. Since the top opening of body 1 where front wall 4 is to be located opens outwardly when feeder 3 is attached to body 1 through opening 2 in such a manner that at least a part or, if necessary, entire front wall 4 extends outside body 1, feed can be easily supplied to feeder 3 through its opening without pulling out body 1 from the rack. This enables automatic feeding. It is favorably to form front wall 4, specifically, the part extending outside body 1, as an imperforate wall so as to prevent feed from spilling out front wall 4. The feed, for example, in rod or cube form, supplied to feeder 3 can be easily given to the small animal by imparting a grilled structure, such as lattice or mesh, to the part of feeder 3 which resides inside body 1. Specifically, by positioning the lower end of feeder 3 inside body 1, a small animal can more easily consume the supplied feed. It is favorable to make feeder 3 out of metal, such as steel or stainless steel, in order to prevent the damage to feeder 3 by a small animal such as a rodent. By providing an upwardly-widened structure to the opposed side walls of feeder 3 similarly as in body 1, feeder 3 is stably attached to body 1, and handling of feeder 3 during movement or housing is greatly facilitated because each feeder 3 can be plunged on the top of another feeder.

The means which removably attaches feeder 3 to opening 2 can be freely chosen. For example, as shown in FIG. 4, feeder 3 can be removably attached to body 1 by imparting to the opposed side walls of feeder 3 an upwardly-widened structure which fits to the inside shape of the opposed side walls in body 1, and plunging feeder 3 into body 1. In this case, it is desirable to provide flange means 5 at the upper edges of the opposed side walls so that feeder 3 can be engaged on the upper edges of body 1. Also, it is favorable to provide engaging projection 6 at the upper edges of both side walls in body 1 so that movement of cage 1 is prevented by engaging either the edge surface of flange means 5 or engaging a hole provided on or through feeder 3 to projection 6. Feeder 3 can be stably and removably supported with body 1 by providing, as shown in FIG. 5, stopper means 7 at the lower end of front wall 4, and placing feeder 3 on the upper edge of opening 2. Feeder 3 can be removably attached together with lid means 8 to body 1 as shown in FIG. 6. Feeder 3 can be removably supported on body 1 by placing the bottom of feeder 3 on the upper edge of opening 2 provided through the upper part over the front wall of body 1.

Now explaining body 1, reference numeral 9 designates a flange means which is provided at the upper edges of the opposed side walls of body 1. Flange means 9 supports lid means 8 or flange means 5. When body 1 is stacked in rack 10 as shown in FIG. 7, flange means 9 is slidably inserted along guide rail 11 provided on rack 10 to suspend feeder 3 therefrom. This arrangement facilitates the insertion and removal of body 1 from rack 10. Therefore, the present invention simplifies breeding care even when breeding cages are multilayered in rack 10 during use.

Reference numeral 12 designate a depression which is provided in a respective bottom corner of body 1 as shown in FIG. 8, or through one or more bottom corners as shown in FIG. 9 so that feces and/or urine excreted by the animal are caught by the depression. Depression 12 has a depth of about 1 to 25 mm.

Reference numeral 13 designates a hole provided through depression 12. Desirably, a plurality of holes 13, having a depth of about 3 to 15 mm, are provided. For example, when depression 12 is relatively small, a plurality of holes 13 are provided over depression 12, and, when depression 12 is relatively large, a plurality of holes 13 are provided through the corners of depression 12 as shown in FIG. 9.

As described above, with the arrangement wherein depression 12 and holes 13 are provided in the bottom corner(s) of body 1, the small animal housed within body 1 behaviorally excretes there, and the feces and urine are caught by hole 13 and then easily pass therethrough outside body 1. Accordingly, the use of bedding in body 1 (for example, chopped rice straws, sawdust or "White Flake", a bedding prepared from American fir, commercialized by Charles River Japan, Inc., Atsugi-shi, Kanagawa-ken, Japan) can be greatly reduced extremely or even omitted.

Furthermore, the feces and urine from body 1 can be gathered automatically outside of body 1 by housing in rack 10 a plurality of bodies 1 having depressions 12 and holes 13, and providing belt convenyor 14 beneath the bottoms of bodies 1 to collect and remove excreted matter which has fallen through hole 13 of depressions 12, as shown in FIG. 10.

Reference numeral 15 designates a feed hopper which is equipped upon rack 10 in a manner as shown in FIGS. 11 and 12 so that the feed is supplied to feeder 3 equipped on a plurality of bodies 1 housed in rack 10. Automatic feeding can be facilitated by using a sensor to detect decreases in the amount of feed in feeder 3.

Water supply can be attained by suitably providing a water nozzle with conventional cock or valve to feeder 3 or body 1 in such manner that the small animal in body 1 freely receives water therefrom.

Reference numeral 16 designates a supporting piece which is used for stacking breeding cages, and several supporting pieces 16 are provided on the outside of the opposed side walls of body 1. Since, when one body 1 is stacked by plunging it on the top of another similar body, supporting piece 16 restricts insertion of body 1 to the middle position of the other body and retains a resident space for the small animal, a plurality of bodies 1 can be compactly moved without transferring the small animals from the bodies to other breeding cages.

As described above, since an opening is provided on the body according to the invention, the present breeding cage saves feed, and, therefore, decreases the production cost of small animals much more than the use of conventional breeding cages.

The following describes a breeding experiment using the present and conventional breeding cages.

EXPERIMENT 1

Breeding experiment using small animal

In order to compare the breeding cage of the invention with conventional breeding cage, the following breeding experiment was conducted using hamsters as the small animals which were housed in breeding cages multilayered in a rack.

As the breeding cage of the invention, the body as shown in FIG. 8 wherein a depression and holes were provided through respective bottom corner of the body, was used with a feeder as shown in FIG. 3 but without bedding. As the control, the breeding cage shown in FIG. 14 was used with "White Flake" as the bedding in a conventional manner.

The size of either breeding cage was about 14 cm in height, about 450 $cm^2$ in floor area, and the feeder was about 0.9 liters in capacity. The resident space of the present breeding cage was about 6.5 liters, and that of the control was about 6.0 liters.

In both systems, a commercialized solid feed was used, and water nozzles were provided so that the hamsters could freely drink water.

During the breeding, the hamsters were checked for reproduction and growth of their liters.

EXPERIMENT 1-(1)

Reproduction

In the reproduction experiment, 20 female adult hamsters were used, and the number of survival litters and survivability were checked until the litters became 21-days old.

One female adult hamster was housed and fed in one breeding cage wherein a small amount of shredded paper was placed as the nest material.

The results were as shown in Table I.

TABLE I

| Breeding cage | Parturition rate | Number of survival litters (Survivability) | | |
|---|---|---|---|---|
| | | 0th day | 14th day | 21st day |
| Present invention | 95% | 196 (100%) | 159 (81%) | 157 (80%) |
| Control | 90% | 183 (100%) | 134 (73%) | 123 (67%) |

EXPERIMENT 1-(2)

Growth of litters

This growth experiment was conducted by using 100 21-day old weaned hamsters which were weighed daily until they became 56-days old.

Five hamsters were housed and fed in each breeding cage.

The results were as shown in Table II.

TABLE II

| Breeding cage | Breeding period (days) | | | | | |
|---|---|---|---|---|---|---|
| | 21 | 28 | 35 | 42 | 49 | 56 |
| Present invention | 40.5 ± 3.0 g | 72.1 ± 5.0 g | 94.2 ± 5.4 g | 109.0 ± 6.1 g | 123.7 ± 7.3 g | 136.5 ± 8.6 g |
| Control | 40.5 ± 3.0 g | 69.0 ± 6.5 g | 86.8 ± 4.8 g | 99.0 ± 5.6 g | 111.5 ± 6.4 g | 124.0 ± 7.8 g |

The data revealed that the hamsters bred with the present breeding cage were superior in reproduction and growth of litters to those bred with the conventional breeding cage.

As is evident from the above, in comparison with the conventional breeding cage, the breeding cage of the invention is much more suitable for a multiple breeding cage which is multilayered in a rack.

Furthermore, the breeding cage of the invention can be supplied with feed without pulling it out from the rack, and this feature facilitates automatic feeding.

Additionally, since in the breeding cage of the invention the excreted feces and urine drop outside the breeding cage, it requires no bedding and facilitates the automatic carriage of the feces and urine using a belt conveyor.

When the body is formed in one piece of a synthetic resin according to the invention, the opening provided at the upper part of the front wall, or front- and side-walls greatly decreases the production cost of the breeding cage.

The breeding cage of the invention can be compactly moved even with a (the) small animal(s) because the breeding cage without the feeder can be stacked on the top of another body.

All the related activites for the feeder, such as washing, drying, movement and storage, can be carried out within a relatively small space because the feeder can be also stacked on the opening of another feeder.

The breeding attained with the present breeding cage is superior to that attained with conventional breeding cages.

While there has been described what is at present considered to be the preferred embodiments of the invention, it will be understood that various modifications may be made therein, and it is intended to cover in the appended claims all such modifications as fall within the true spirit and scope of the invention.

We claim:

1. A cage for breeding a small animal, comprising:
    a feeder means including a chute having two sides, a forward wall and a rearward wall; and
    a trapezoidal body having an open top, a bottom, two side walls, a front wall and a rear wall, said body widening from said bottom to said open top, the front wall of the body extending upward from said bottom for less than the distance between said open top and said bottom, thereby defining at opening through an upper part of said front wall of said body, said feeder means being removably received within said opening so that a portion of said forward wall of said chute extends forward of said front wall of said body and a rearward wall of said chute closes said opening.

2. The cage of claim 1, wherein each side wall has a forward portion with an upper part and an opening extending through said upper part, each said opening in each upper part of each said side wall joining with said opening in said front wall, said removable feeder means closing both said opening provided through the upper part of the front wall of the body, and said openings provided through said upper parts of said side walls of the body.

3. The cage of claim 1, wherein said feeder means is in the form of a top-opened trough, said forward wall of said chute being forwardly inclined.

4. The cage of claim 1, wherein said feeder means is positioned in such manner that a lower end of the chute extends inside the body, while an upper part of said forward wall of the chute extends outside the body.

5. The cage of claim 1, wherein the rearward wall of the chute extends inside the body and is perforated, and further wherein the forward wall of said chute is imperforate.

6. The cage of claim 1, wherein said feeder means is made of a metal.

7. The cage of claim 1, wherein a depression and hole are provided through a bottom corner of the body.

8. The cage of claim 1, wherein a supporting piece extends outside of at least one of said side walls of the body.

9. The cage of claim 1, wherein said side walls of the body have outwardly flanged upper edges.

10. The cage of claim 1, wherein the body is formed in one piece from a synthetic resin.

11. A method for breeding a small animal, comprising feeding a small animal in a breeding cage which comprises:
    a feeder means including a chute having two sides, a forward wall and a rearward wall; and
    a trapezoidal body having an open top, a bottom, two side walls, a front wall and a rear wall, said body widening from said bottom to said open top, the front wall of the body extending upward from said bottom for less than the distance between said open top and said bottom, thereby defining an opening through an upper part of said front wall of said body, said feeder means being removably received within said opening so that a portion of said forward wall of said chute extends forward of said front wall of said body and said rearward wall of said chute closes said opening.

12. The method of claim 11, wherein a plurality of the breeding cages are retained on a rack in a multilayered arrangement and the small animals are fed in the breeding cages.

13. The method of claim 11, containing the additional steps of:

positioning the feeder means in such manner that a lower end of said chute extends inside the body, while an upper part of the forward wall of the chute extends outside the body; and automatically supplying a feed at the upper part of the forward wall of the chute.

14. The method of claim 11, wherein a depression with a hole therein is provided in a corner at the bottom of the body so that feces or urine excreted by the small animal are caught by the depression and hole and transferred outside the body and wherein no bedding is used.

15. The method of claim 11, wherein a depression with a hole therein is provided in a corner of the bottom of the body and said hole passes feces and urine excreted by the small animal outside said body, whereafter the feces and urine fall onto and are carried by a belt conveyor.

16. The method of claim 11, wherein said small animal fed within said cage is a rodent.

17. The method of claim 11, wherein said small animal fed within said cage is a hamster.

* * * * *

UNITED STATES PATENT AND TRADEMARK OFFICE
CERTIFICATE OF CORRECTION

PATENT NO. : 4,784,084

DATED : November 15, 1988

INVENTOR(S) : Michihiro Kohguchi, et al.

It is certified that error appears in the above-identified patent and that said Letters Patent is hereby corrected as shown below:

The title page showing the illustrative figure should be deleted to appear as per attached title page.

The sheets of drawing should be deleted to be replaced with the sheet of drawing as shown on the attached sheets.

Signed and Sealed this

Fifth Day of May, 1992

Attest:

DOUGLAS B. COMER

Attesting Officer

Acting Commissioner of Patents and Trademarks

United States Patent [19]

Kohguchi et al.

[11] Patent Number: 4,784,084
[45] Date of Patent: Nov. 15, 1988

[54] BREEDING CAGE FOR SMALL ANIMAL AND BREEDING OF SMALL ANIMAL USING THE SAME

[75] Inventors: Michihiro Kohguchi; Tetsushi Ishikawa; Toshio Miyake, all of Okayama, Japan

[73] Assignee: Kabushiki Kaisha Hayashibara Seibutsu Kagaku Kenkyujo, Okayama, Japan

[21] Appl. No.: 942,804

[22] Filed: Dec. 17, 1986

[30] Foreign Application Priority Data

Dec. 31, 1985 [JP] Japan .................. 60-297359

[51] Int. Cl.⁴ .................................. A01K 31/00
[52] U.S. Cl. ...................................... 119/18
[58] Field of Search ............. 119/17, 18, 61, 51 R

[56] References Cited

U.S. PATENT DOCUMENTS

| 3,002,492 | 10/1961 | Naturale | 119/18 |
| 3,518,971 | 7/1970 | Gasse et al. | 119/18 |
| 3,830,200 | 8/1974 | Patterson | 119/17 X |
| 3,978,819 | 9/1976 | Lovitt | 119/18 X |

FOREIGN PATENT DOCUMENTS

| 3411679 | 10/1984 | Fed. Rep. of Germany | 119/18 |
| 682198 | 11/1952 | United Kingdom | 119/18 |
| 967112 | 8/1964 | United Kingdom | 119/18 |

*Primary Examiner*—Robert P. Swiatek
*Assistant Examiner*—R. Thomas Price
*Attorney, Agent, or Firm*—Browdy and Neimark

[57] ABSTRACT

There is disclosed a novel breeding cage and breeding of small animal using the same. The breeding cage comprises a feeder; and a top-opened body in trapezoidal shape that widens towards the top opening, the front wall having through its upper part an opening that can be removably closed with the feeder.

17 Claims, 2 Drawing Sheets

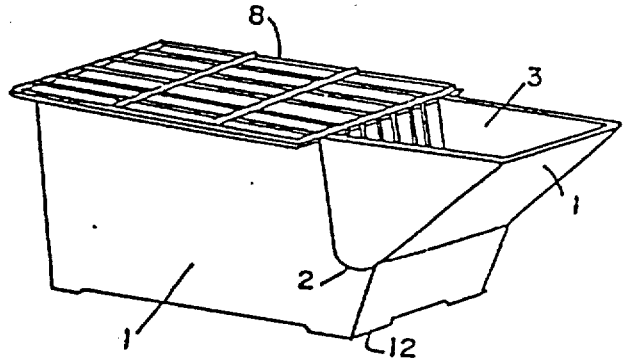

UNITED STATES PATENT AND TRADEMARK OFFICE
CERTIFICATE OF CORRECTION

PATENT NO. : 4,784,084

Page 3 of 4

DATED : November 15, 1988

INVENTOR(S) : KOHGUCHI et al.

It is certified that error appears in the above-identified patent and that said Letters Patent is hereby corrected as shown below:

Sheet 1 of 2    Delete drawing, insert one below:

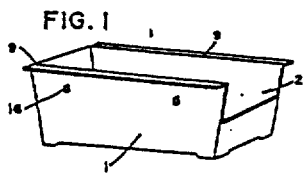
FIG. 1

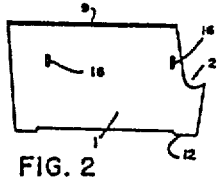
FIG. 2

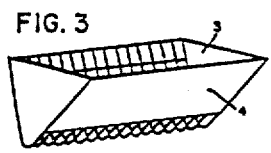
FIG. 3

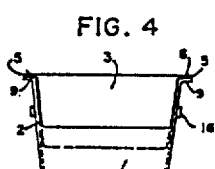
FIG. 4

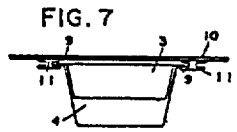
FIG. 7

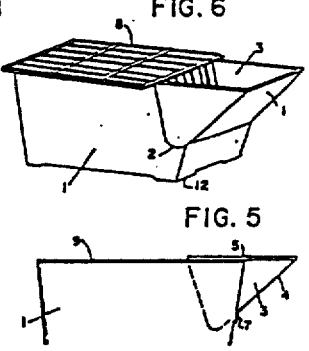
FIG. 8

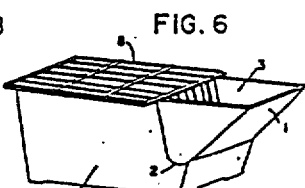
FIG. 6

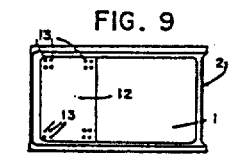
FIG. 9

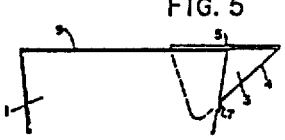
FIG. 5

UNITED STATES PATENT AND TRADEMARK OFFICE
CERTIFICATE OF CORRECTION

PATENT NO. : 4,784,084

DATED : November 15, 1988

INVENTOR(S) : KOHGUCHI et al.

It is certified that error appears in the above-identified patent and that said Letters Patent is hereby corrected as shown below:

Sheet 2 of 2    Delete drawing, insert one below:

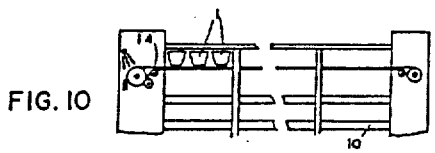

FIG. 10

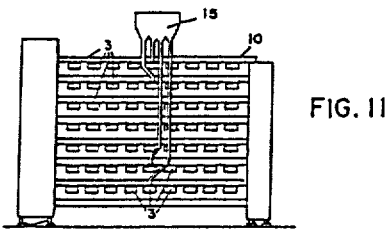

FIG. 11

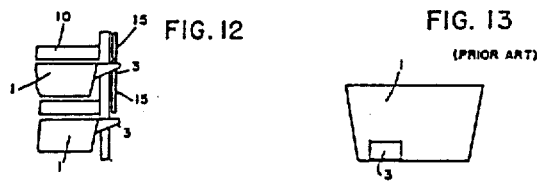

FIG. 12    FIG. 13
(PRIOR ART)

FIG. 14    FIG. 15

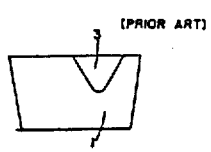    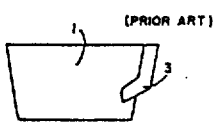

(PRIOR ART)    (PRIOR ART)